United States Patent
Mejuhas

(10) Patent No.: US 9,669,934 B2
(45) Date of Patent: Jun. 6, 2017

(54) SEAT FASTENING

(71) Applicant: RECARO Aircraft Seating GmbH & Co. KG, Schwaebisch Hall (DE)

(72) Inventor: Marsel Mejuhas, Schwaebisch Hall (DE)

(73) Assignee: RECARO Aircraft Seating GmbH & Co. KG, Schwaebisch Hall (DE)

( * ) Notice: Subject to any disclaimer, the term of this patent is extended or adjusted under 35 U.S.C. 154(b) by 0 days.

(21) Appl. No.: 14/781,388

(22) PCT Filed: Mar. 27, 2014

(86) PCT No.: PCT/EP2014/056140
§ 371 (c)(1),
(2) Date: Sep. 30, 2015

(87) PCT Pub. No.: WO2014/161764
PCT Pub. Date: Oct. 9, 2014

(65) Prior Publication Data
US 2016/0039526 A1    Feb. 11, 2016

(30) Foreign Application Priority Data
Apr. 5, 2013 (DE) .......... 10 2013 103 435

(51) Int. Cl.
*B64D 11/06* (2006.01)
*F16B 2/18* (2006.01)
(Continued)

(52) U.S. Cl.
CPC ...... *B64D 11/0696* (2013.01); *B60N 2/01575* (2013.01); *F16B 2/185* (2013.01);
(Continued)

(58) Field of Classification Search
CPC .......... B60N 2/0155; B60N 2/02; B60N 2/06; B60N 2/08; B60N 2/01583; B60N 1/01575; B64D 11/0696; B64C 1/20
(Continued)

(56) References Cited

U.S. PATENT DOCUMENTS 3,282,229 A * 11/1966 Elsner .................... B60P 7/0815
                                                              410/105
3,523,669 A *  8/1970 Avallone ............... F16L 3/1075
                                                              248/505
(Continued)

FOREIGN PATENT DOCUMENTS

DE   10 2004 047 455 A1   4/2006
DE   10 2011 013 688 A1   9/2011
(Continued)

OTHER PUBLICATIONS

German Search Report issued on Jan. 15, 2014 in the German patent application No. DE 10 2013 103 4357(partial translation attached).
(Continued)

*Primary Examiner* — Brian Mattei
*Assistant Examiner* — Taylor Morris
(74) *Attorney, Agent, or Firm* — Posz Law Group, PLC

(57) ABSTRACT

The invention proceeds from a seat fastening for fastening a seat, in particular an aircraft seat, to a fastening rail, with at least one base body, which is provided at least for a vertical fastening in the fastening rail, and with at least one horizontal-fastening element, which is slidable with respect to the base body at least between a locking position and an unlocking position.
It is proposed that the seat fastening comprises at least one locking device, which is provided to fixate the at least one horizontal-fastening element in the unlocking position.

9 Claims, 4 Drawing Sheets

Figure 1:
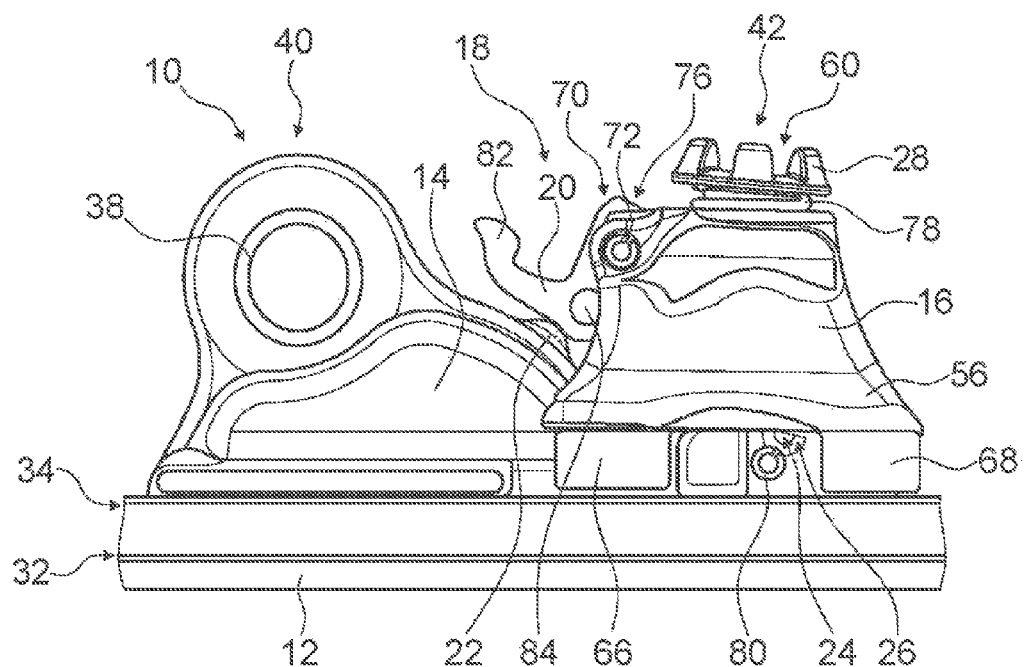

(51) Int. Cl.
*B60N 2/015* (2006.01)
*B60N 2/02* (2006.01)
*B60N 2/06* (2006.01)
*B60N 2/08* (2006.01)
*B64C 1/20* (2006.01)

(52) U.S. Cl.
CPC ........ *B60N 2/0155* (2013.01); *B60N 2/01583* (2013.01); *B60N 2/02* (2013.01); *B60N 2/06* (2013.01); *B60N 2/08* (2013.01); *B64C 1/20* (2013.01)

(58) Field of Classification Search
USPC ............. 410/105; 248/424, 429, 503, 503.1; 244/118.1, 118.5, 118.6
See application file for complete search history.

(56) References Cited

U.S. PATENT DOCUMENTS

| | | | | |
|---|---|---|---|---|
| 4,376,522 A * | 3/1983 | Banks | ................ | B64D 11/0696 244/118.6 |
| 4,396,175 A * | 8/1983 | Long | ................. | B64D 11/0696 244/118.6 |
| 4,796,837 A * | 1/1989 | Dowd | ................ | B64D 11/0696 244/122 R |
| 4,932,816 A * | 6/1990 | Ligensa | ............. | B64D 11/0696 244/118.6 |
| 5,489,172 A * | 2/1996 | Michler | ............. | B64D 11/0696 244/118.1 |
| 7,661,637 B2 * | 2/2010 | Mejuhas | ............ | B64D 11/0696 248/157 |
| 7,785,053 B2 * | 8/2010 | Hudson | .............. | B64D 11/0696 410/104 |
| 7,975,979 B2 * | 7/2011 | Bishop | .................. | B60P 7/0815 244/118.6 |
| 2007/0090261 A1 | 4/2007 | Mehujas et al. | | |
| 2007/0138821 A1 | 6/2007 | Mejuhas et al. | | |
| 2008/0149764 A1 | 6/2008 | Frey | | |
| 2011/0253874 A1 | 10/2011 | Marechal | | |
| 2012/0217368 A1 | 8/2012 | Zunino et al. | | |
| 2012/0273616 A1 | 11/2012 | Marechal | | |

FOREIGN PATENT DOCUMENTS

| | | |
|---|---|---|
| DE | 20 2011 108 804 U1 | 3/2012 |
| DE | 10 2012 205 167 A1 | 10/2012 |
| EP | 1 775 217 A2 | 7/2006 |
| EP | 1 792 827 A2 | 8/2006 |
| WO | 2010-016086 A1 | 2/2010 |

OTHER PUBLICATIONS

International Search Report issued on Jul. 11, 2014 in the PCT application No. PCT/EP2014/056140.
Written Opinion of the International Searching Authority issued on Jul. 11, 2014 in the PCT application No. PCT/EP2014/056140.
International Preliminary Report on Patentability issued on Oct. 6, 2015 in the PCT application No. PCT/EP2014/056140.

* cited by examiner

SEAT FASTENING

CROSS REFERENCE TO RELATED APPLICATIONS

This application is a U.S. national stage application of PCT/EP2014/056140 filed on Mar. 27, 2014, which claims priority to German Patent Application No. 10 2013 103 435.7 filed on Apr. 5, 2013, the contents of which are incorporated herein by reference.

STATE OF THE ART

The invention relates to a seat fastening according to the preamble of patent claim 1.

The objective of the invention is, in particular, to provide a generic seat fastening with improved characteristics regarding an assembly. The objective is achieved according to the invention by the features of patent claim 1, while advantageous implementations and further developments of the invention may be obtained from the subclaims.

Advantages of the Invention

The invention is based on a seat fastening for fastening a seat, in particular an aircraft seat, at a fastening rail, with at least one base body at least provided for a vertical fastening in the fastening rail, and with at least one horizontal-fastening element, which is slidable with respect to the base body at least between a locking position and an unlocking position.

It is proposed that the seat fastening comprises at least one locking device, which is provided to fixate the at least one horizontal-fastening element in the unlocking position. By a "fastening" is herein to be understood, in particular, a fixed, rigid connection to an element, in particular to a fastening rail. A "base body" is to be understood, in this context, in particular as an element provided for connecting to the fastening rail and in particular provided for transferring forces to the fastening rail, which are introduced into the element from an element fastened to it, preferably from an aircraft seat. By a "fastening rail" is to be understood, in particular, a rail that preferably forms a hollow profile provided for a form-fit connection to an element, in particular to the base body of the seat fastening. Herein it is also conceivable that the fastening rail has a profile with an undercut and an element, e.g. a seat fastening with a hollow profile, engages into the fastening rail. A "horizontal-fastening element" is herein to be understood, in particular, as an element which can fixate the seat fastening in the fastening rail in a horizontal direction, in particular in a longitudinal direction of the fastening rail, in at least one operating position. A "locking position" is herein to be understood, in particular, as a position of the horizontal-fastening element in which the horizontal-fastening element fixates the base body in the fastening rail in a horizontal direction. An "unlocking position" is herein to be understood, in particular, as a position of the horizontal-fastening element in which the horizontal-fastening element releases, in particular does not fixate, the base body in the fastening rail in the horizontal direction, thus allowing a sliding of the base body and thus of the seat fastening in the fastening rail. "Fixate" is herein to mean, in particular, fixedly arrange with respect to a certain element, e.g. in particular to the base body. "Provided" is to mean, in particular, specifically designed and/or equipped. By an object being provided for a certain function is to be understood, in particular, that the object implements and/or carries out said certain function in at least one application state and/or operating state. Thereby the seat fastening can be embodied in a particularly advantageous manner, in such a way that, in particular when displacing a seat that is fastened to fastening rails by several seat fastenings, the seat fastenings can be transversed in the fastening rail without the horizontal-fastening element of a seat fastening engaging into the corresponding fastening rail, thus encumbering a displacement of the seat. By the implementation of the seat fastening according to the invention, an assembly of seats can thus be facilitated, in particular of aircraft seats in fastening rails.

It is further proposed that the horizontal-fastening element engages around the base body. Herein "engaging around the base body" is to mean, in particular, that the horizontal-fastening element delimits the base body with respect to the outside at least towards one side, preferably towards at least two sides and in particular towards three sides. Herein "engaging" is also to mean, in particular, that the horizontal-fastening element lies upon the base body on the outside. By this is herein, in particular, also to be understood that the horizontal-fastening element is not arranged inside the base body. This allows implementing the horizontal-fastening element in an especially advantageous fashion and coupling it with the base body in a simple manner.

Furthermore it is proposed that the locking device is provided to move the horizontal-fastening element both in a vertical direction and in a horizontal direction, for the purpose of a displacement of the horizontal-fastening element between its locking position and its unlocking position. By a "vertical direction" is herein to be understood, in particular, a direction that is orthogonal to a longitudinal direction in which the base body has its main extension direction and orthogonal to a transverse direction in which the base body has its smallest extension direction. The vertical direction is herein, in particular in a state when assembled in an aircraft, implemented as a direction that is orthogonal to a plane of the cabin floor on which the seats are fastened via the fastening rails. A "horizontal direction" is herein to be understood, in particular, as a direction that extends parallel to a longitudinal direction and thus in particular to a main extension direction of the base body and of the seat fastening. The horizontal direction is herein preferably oriented parallel to a longitudinal extension of the fastening rail in which the seat fastening can be fixated and thus, in a state when assembled in an aircraft, in a plane of a cabin floor. In this the horizontal-fastening element is moved in a horizontal direction just by a fraction of a distance by which the horizontal-fastening element is moved when being displaced in a vertical direction. This allows a particularly advantageous implementation of the unlocking position of the horizontal-fastening element.

It is also proposed that the locking device comprises at least one lever unit, by means of which the horizontal-fastening element can be displaced between the locking position and the unlocking position. A "lever unit" is herein to be understood, in particular, as a pivotable element which is preferentially pivotably mounted to the horizontal-fastening element. Herein it is to be mentioned, as a matter of principle, that the locking device may also comprise other displacement units for displacing the horizontal-fastening element, which displace the horizontal-fastening element between the locking position and the unlocking position, for example, by a linear displacement, a rotation, or a tilting. The displacement unit could herein be embodied, for example, as a linear guiding implemented by guiding rails. Thereby the horizontal-fastening element can be displaced between the locking position and the unlocking position in a particularly advantageous and simple manner.

It is moreover proposed that the seat fastening comprises at least one support element, which is provided to support the lever unit at least during a displacement of the horizontal-fastening element and a locking position. By a "support element" is herein to be understood, in particular, an element that is in particular embodied corresponding to the lever unit and has such a contour that by supporting the lever unit on the support element a movement of the horizontal-fastening element, which is connected to the lever unit, is achieved, by which movement the horizontal-fastening element can be transversed between the locking position and the unlocking position. Principally it is also conceivable that the lever unit can be connected to the base body, additionally or exclusively, via a form-fit element, e.g. a latch element, the lever unit being thus firmly positioned at the base body in the locking position. This allows transversing the horizontal-fastening element between the locking position and the unlocking position in a particularly simple and precise fashion.

Furthermore it is proposed that the support element is embodied as a bulge molded to the base body. By "molded to the base body" is herein to be understood, in particular, that the support element is embodied in a one-part implementation with the base body and as a bulge. This allows implementing the support element particularly simply and advantageously.

It is further proposed that the base body comprises a form-fit element upon which, in the unlocking position, the horizontal-fastening element lies for fixation. A "form-fit element" is herein to be understood, in particular, as an element which can enter into a form-fit connection via a geometrical engagement with a corresponding form-fit element and/or via lying upon a corresponding form-fit element. Herein "lying upon" is to mean, in particular, that the horizontal-fastening element is in direct contact with the form-fit element. As a result of this, the horizontal-fastening element can be fixated to the base body in the unlocking position in a particularly simple manner.

Moreover it is proposed that the form-fit element is implemented as a bulge molded to the base body. By "molded to the base-body" is herein to be understood, in particular, that the form-fit element is embodied in a one-part implementation with the base body. This allows implementing the form-fit element of the base body particularly simply.

It is also proposed that the horizontal-fastening element comprises a form-fit element, which is at least in the unlocking position connected to the form-fit element of the base body in a form-fit, self-locking manner. Herein "self-locking" is to mean, in particular, that the form-fit elements of the horizontal-fastening element and of the base body present a friction-caused resistance against a slipping, i.e. against a release of the form-fit connection. By "form-fit" is to be understood, in particular, that adjacent surfaces of structural components, which are connected to each other in a form-fit manner, exert a holding force on each other, which acts in a normal direction of the surfaces. In particular, the structural components are geometrically engaged into each other. In this "connected in a form-fit manner" is to mean, in particular, that the horizontal-fastening element and the base body are coupled with each other by means of a form-fit connection. This allows implementing the form-fit connection between the horizontal-fastening element and the base body in a particularly advantageous manner.

Furthermore it is proposed that the seat fastening comprises at least one fastening element for a fixation of the base body, wherein the locking device is at least in the locking position provided to secure the fastening element. A "fastening element" is herein to be understood, in particular, as an element which firmly connects two elements to each other, in particular the horizontal-fastening element and the base body. Herein the fastening element is preferably implemented as a fastening screw comprising a thread, by means of which the fastening screw can be firmly connected to the base body via a correspondingly embodied counter-thread in the base body. Principally it is also conceivable that the fastening element is implemented as an eccentric fastening element comprising an eccentric region which can be brought into a form-fit engagement with a form-fit element of the base body by rotating the fastening element, for the purpose of firmly connecting the horizontal-fastening element to the base body. "To secure the fastening element" is herein to mean, in particular, that the locking device prevents in the locking position a release, namely preferably a rotating of the fastening element, preferably via a form-fit engagement into the fastening element. As a result of this, an inadvertent release of the fastening element, e.g. due to vibration, can advantageously be prevented.

It is further proposed that the lever unit forms a form-fit element which, at least in a locking position, engages into the fastening element for the purpose of securing the fastening element. As a result of this, the fastening element can be secured against being rotated in a particularly simple and secure manner.

The seat fastening according to the invention is herein not to be limited to the application and implementation form described above. In particular, the seat fastening according to the invention may, to fulfill a functionality herein described, comprise a number of individual elements, structural components and units that differs from the number mentioned herein.

DRAWINGS

Further advantages may be obtained from the following description of the drawings. In the drawings one exemplary embodiment of the invention is shown. The drawings, the description and the claims contain a plurality of features in combination. The person having ordinary skill in the art will purposefully also consider the features separately and will find further expedient combinations.

Figure 2:
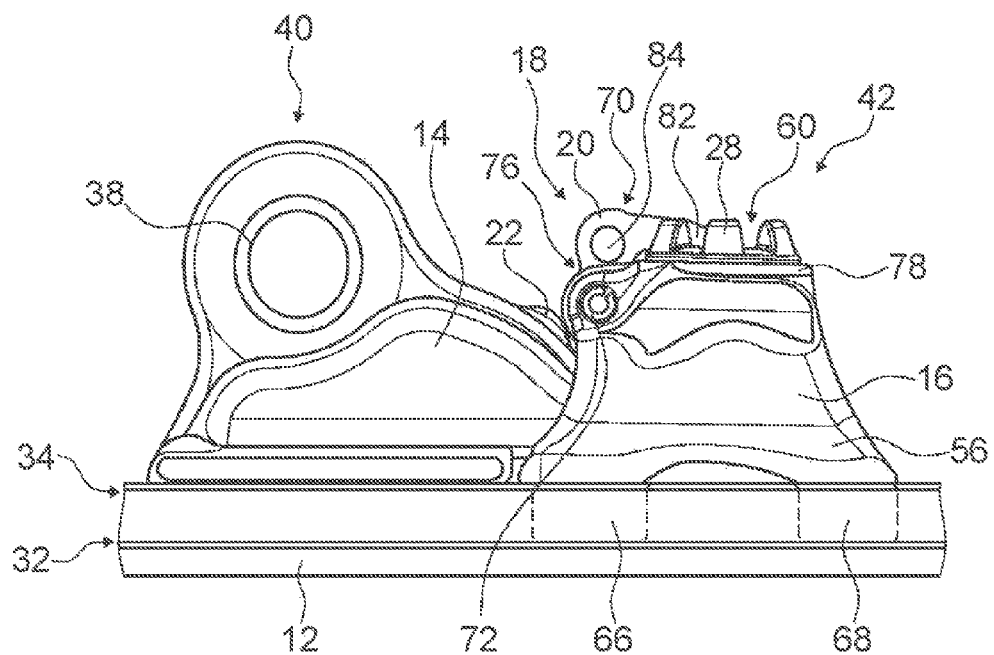
Figure 3:
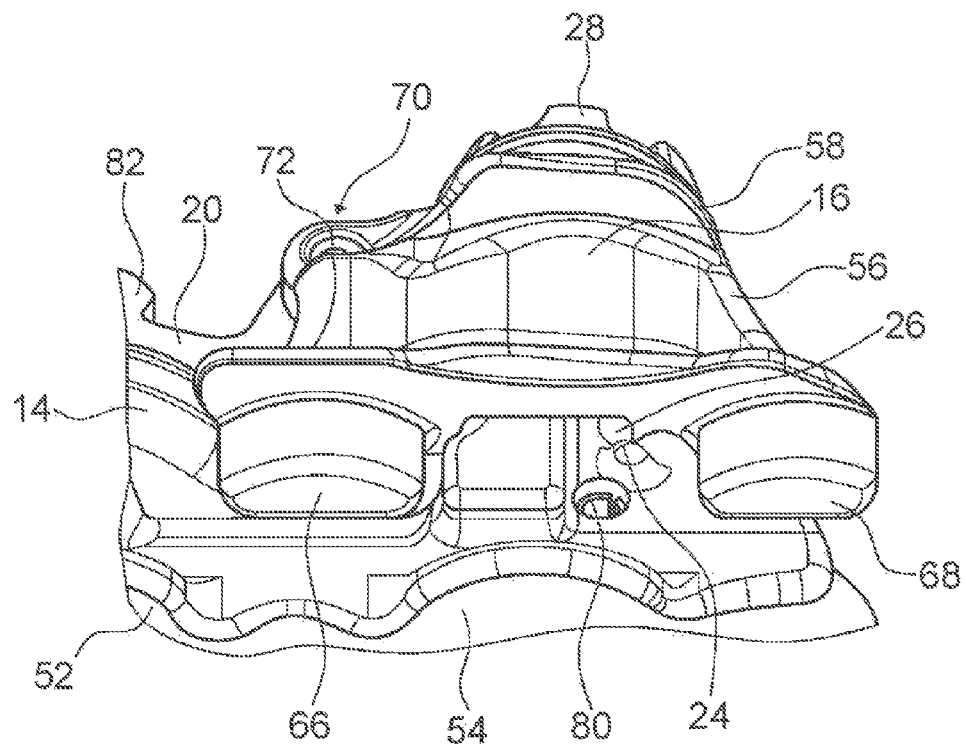
Figure 4:
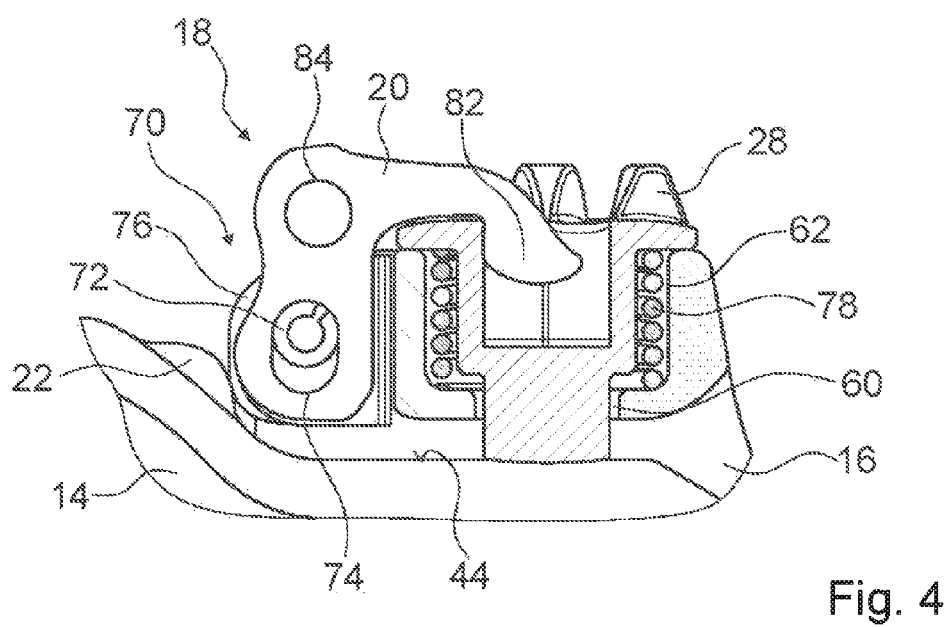
Figure 5:
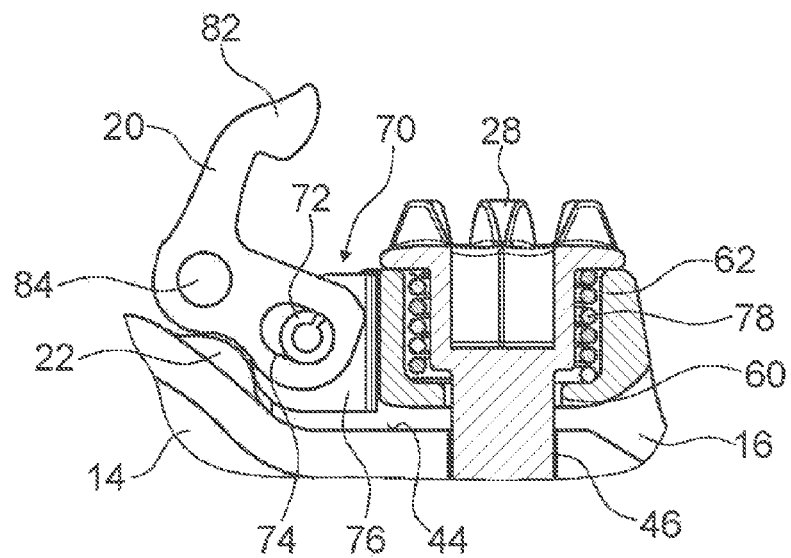
Figure 6:
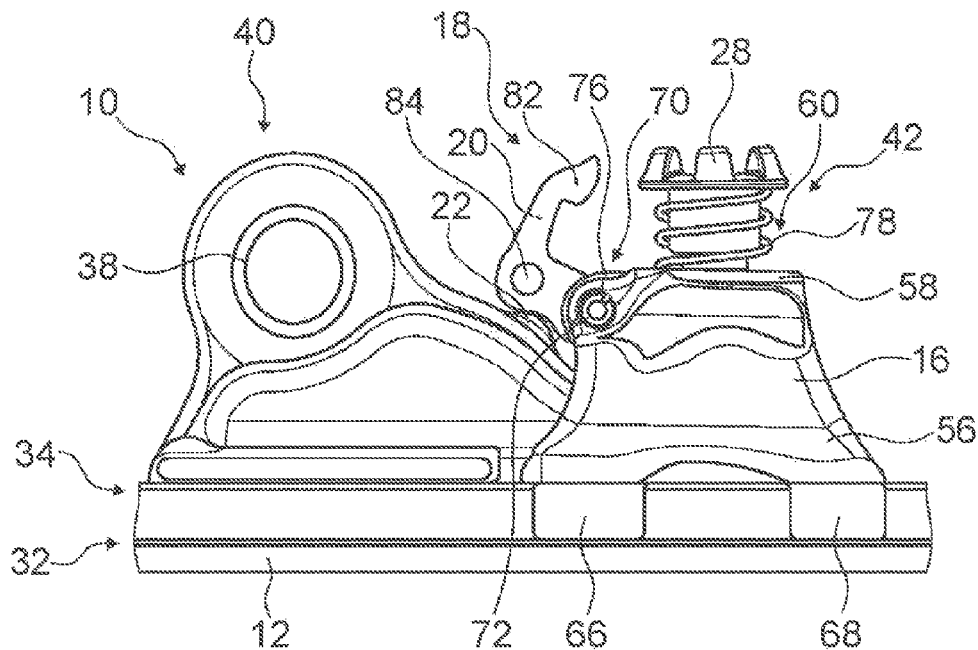
Figure 7:
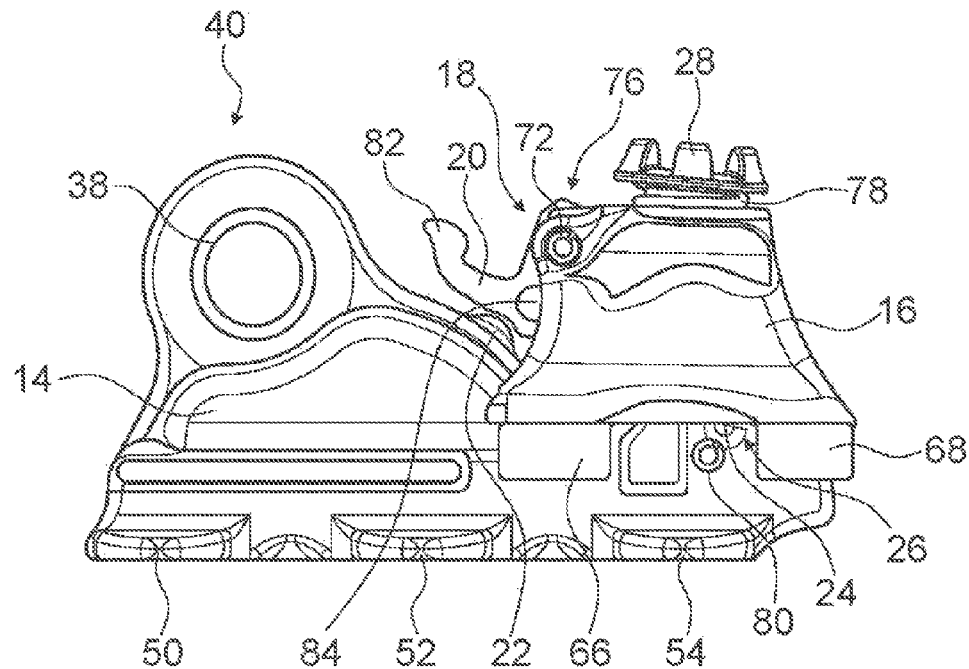
Figure 8:
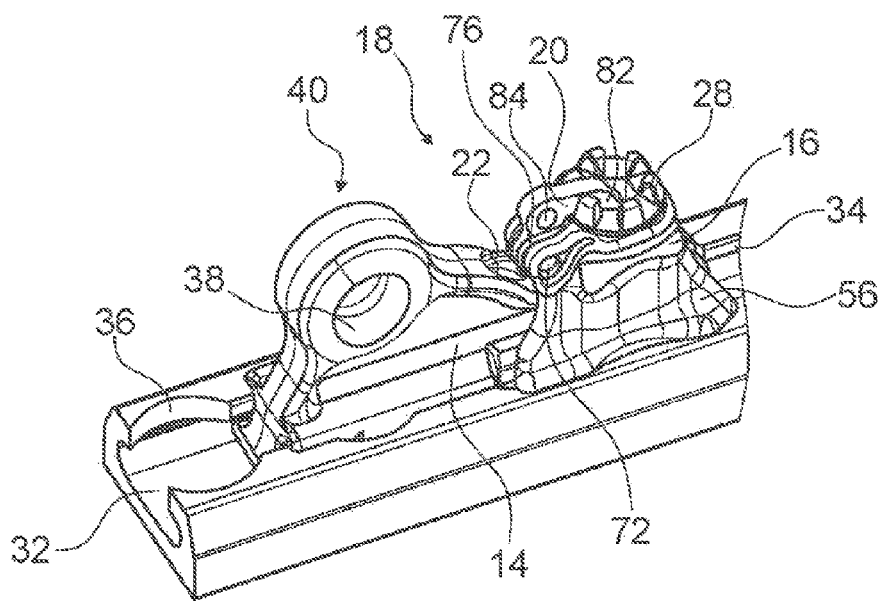

It is shown in:

FIG. 1 a lateral view of a seat fastening according to the invention, with a base body and with a horizontal-fastening element that is in an unlocking position, FIG. 2 the seat fastening in a state when it is firmly connected to a fastening rail, with the horizontal-fastening element in a locking position, FIG. 3 a schematic view of a portion of the base body and of the horizontal-fastening element onto an underside, FIG. 4 a sectional view through a section of the horizontal-fastening element, as well as a fastening element and a lever unit of a locking device in a locked state, FIG. 5 a similar view as in FIG. 4, the lever unit being in an unlocked state, FIG. 6 a lateral view of the seat fastening during a displacement of the horizontal-fastening element between the locking position and the unlocking position, FIG. 7 the seat fastening with the horizontal-fastening element in the unlocking position, and FIG. 8 the seat fastening and the fastening rail in a schematic view.

DESCRIPTION OF THE EXEMPLARY EMBODIMENT

FIGS. 1 to 8 show a seat fastening 10 according to the invention. The seat fastening 10 is provided for fastening an aircraft seat to a transport means, e.g. for fastening in an aircraft. The aircraft comprises for fastening aircraft seats fastening rails 12, which extend parallel to each other and are integrated into a cabin floor of the aircraft. Herein respectively at least two or several fastening rails 12 are provided for fastening an aircraft seat or aircraft seat rows consisting of a plurality of aircraft seats. The fastening rails 12 are each embodied as hollow profiles. Herein the fastening rails 12 each comprise T-shaped longitudinal grooves 32, in which the seat fastening 10 is partially arranged for fastening an aircraft seat. The fastening rails 12 are with their upper side preferably flush and planar with the cabin floor of the aircraft. The fastening rails 12 herein preferably extend substantially parallel to a longitudinal direction of the cabin floor. At the upper side of the fastening rails 12 a narrow longitudinal channel 34 is arranged, which opens the T-shaped longitudinal groove 32 towards the upper side. The longitudinal channel 34 herein comprises pass-through openings 36, which are arranged in a defined grid and respectively broaden the longitudinal channel 34 in a partial region. The pass-through openings 36 herein have a circular basic shape. Herein the pass-through openings 36 respectively connect the upper side of the fastening rail 12 to a lower, broad region of the T-shaped longitudinal groove 32. Herein for the purpose of fastening an aircraft seat or an aircraft seat row, a plurality of seat fastenings 10 are provided. The seat fastening 10 according to the invention is provided to fasten a rear portion of a seat to the respective fastening rail 12. For fastening a front portion of the respective aircraft seat, other seat fastenings (not shown in detail) are provided, which are also partially arranged in the fastening rails 12. In the following only one seat fastening 10 is described, other seat fastenings 10 for fastening a rear portion or an aircraft seat being embodied equivalently.

The seat fastening 10 comprises a base body 14. The base body 14 is provided for guiding the seat fastening 10 in the corresponding fastening rail 12 and for a connection to an aircraft seat. The base body 14 is implemented of a metal, e.g. a stainless steel, a titanium or an aluminum alloy. Principally it is also conceivable that the base body 14 is implemented of another material that is deemed expedient by the person having ordinary skill in the art, e.g. of a plastic or of another metal. The base body 14 has a longitudinal basis shape. In a state when arranged in the fastening rail 12, a long side of the base body 14 runs parallel to the fastening rail 12. A maximum width of the base body 14 is herein smaller than a width of the fastening rail 12. In a front region the base body 14 forms a fastening element 38. The fastening element 38 is herein embodied as a pass-through hole that extends transversely to the long side of the base body 14 and penetrates the base body 14 in its entire width. Herein the base body 14 has a maximum height in the front region 40, in which the fastening element 38 is arranged, and thus extends in its front region 40 the farthest away from the fastening rail 12 in an assembled state. In a rear region 42 the base body 14 has a smaller height than in the front region 40. Herein the height of the base body 14 steadily decreases from the front region 40 to the rear region 42, the base body 14 forming in its rear region 42 a plateau 44, which has a constant height. In the region of the plateau 44 the base body 14 comprises a pass-through hole 46, which is oriented in a vertical direction and extends from the plateau 44 to an underside 48 of the base body 14. The pass-through hole 46 herein comprises an inner thread that is not shown in detail. At the underside 48, which faces the fastening rail 12 in a state when connected to the fastening rail 12, the base body 14 comprises at each of its long sides three form-fit elements 50, 52, 54, which are provided to engage into the fastening rail 12. The form-fit elements 50, 52, 54 are embodied in a one-part implementation with the base body 14. The form-fit elements 50, 52, 54 are herein arranged spaced apart from each other along the long side of the base body 14. Herein the form-fit elements 50, 52, 54 arranged on one long side respectively have a distance from each other that corresponds to a distance of the pass-through openings 36 of the fastening rail 12. Herein respectively two form-fit elements 50, 52, 54 are arranged on the different long sides in pairs, at an identical position in a longitudinal direction. The form-fit elements 50, 52, 54 are embodied as circle-segment-shaped bulges rising from the base body 14 orthogonally to the longitudinal direction. Viewed from above, the form-fit elements 50, 52, 54 form, together with the base body 14, an oval cross section. Herein the oval cross section is embodied smaller than the pass-through openings 36 of the fastening rail 12, due to which the base body 14 with its form-fit elements 50, 52, 54 can be introduced into the T-shaped longitudinal groove 32 of the fastening rail 12 through the pass-through openings 36, for connecting the base body 14 to the fastening rail 12 in a form-fit fashion. By introducing the form-fit elements 50, 52, 54 of the base body 14 into the T-shaped longitudinal groove 32 through the pass-through openings 36 and then sliding the base body 14 inside the T-shaped longitudinal groove 32 into a position in which the form-fit elements 50, 52, 54 of the base body 14 are not congruent with the pass-through openings 36, the base body 14 is connected to the fastening rail 12 in a vertical direction.

For the purpose of locking the seat fastening 10 in a horizontal direction, the seat fastening 10 comprises a horizontal-fastening element 16. The horizontal-fastening element 16 is embodied as a distinct structural component, separate from the base body 14. For implementing the seat fastening 10 the horizontal-fastening element 16 is mounted to the base body 14. The horizontal-fastening element 16 comprises two lateral regions 56, which are arranged spaced apart from each other and are, in a state when mounted on the base body 14, arranged on one longitudinal side of the base body 14 respectively. At an upper side, which in an assembled state faces away from the base body 14, the two lateral regions 56 of the horizontal-fastening element 16 are connected to each other via a middle region 58 in a one-part implementation. In the middle region 58, the horizontal-fastening element 16 comprises a pass-through hole 60 is oriented in a vertical direction, which is, in an assembled state, at least in one operating state in which the seat fastening 10 is firmly connected to the fastening rail 12, oriented in such a way that it is congruent with the pass-through hole 46 of the base body 14. The pass-through hole 60 herein comprises a hollow 62, which has a larger diameter than the pass-through hole 60. At its underside 64, which in an assembled state faces toward the base body 14 and the fastening rail 12, the horizontal-fastening element 16 comprises four horizontal-form-fit elements 66, 68. Herein respectively two horizontal-form-fit elements 66, 68 are arranged at a lateral region of the horizontal-fastening element 16. The horizontal-form-fit elements 66, 68 herein extend away from the underside 64 of the horizontal-fastening element 16 and have a contour that corresponds to the pass-through openings 36 of the fastening rail 12. Herein the two horizontal-form-fit elements 66, 68, which are arranged at a lateral region of the horizontal-fastening element 16, are respectively arranged at a distance from each other which corresponds to a distance of two neighboring pass-through openings 36 of the fastening rail 12. For horizontally fastening the seat fastening 10 in the fastening rail 12, the horizontal-form-fit elements 66, 68 are arranged in pass-through openings 36 of the fastening rail 12, thus connecting the seat fastening 10 to the fastening rail 12 in a horizontal direction in a form-fit fashion.

The horizontal-fastening element 16 has a locking position and an unlocking position. In the locking position and in the unlocking position the horizontal-fastening element 16 has a respectively different position with respect to the base body 14 of the seat fastening 10. The horizontal-fastening element 16 is slidable with respect to the base body 14 between the locking position and the unlocking position. In the locking position the horizontal-form-fit elements 66, 68 are arranged in pass-through openings 36 of the fastening rail 12, thus fixating the seat fastening 10 in the fastening rail 12 in a horizontal direction, while the form-fit elements 50, 52, 54 of the base body 14 connect the seat fastening 10 to the fastening rail 12 in a vertical direction in a form-fit fashion via the T-shaped longitudinal groove 32. In the unlocking position the horizontal-form-fit elements 66, 68 are lifted out of the pass-through openings 36 of the fastening rail 12 and are in no form-fit connection with the fastening rail 12. This allows, in the unlocking position of the horizontal-fastening element 16, the seat fastening 10 to be slid in the fastening rail 12 in a longitudinal direction. If all seat fastenings 10 connecting an aircraft seat via fastening rails 12 are in the unlocking position, the aircraft seat can be slid along the fastening rails 12.

The seat fastening device comprises a locking device 18. The locking device 18 is provided to fixate the horizontal-fastening element 16 in the unlocking position. Herein the locking device 18 fixates the horizontal-fastening element 16 in the unlocking position, in which the horizontal-form-fit elements do not engage into the pass-through openings 36 of the fastening rail 12, thus holding the seat fastening 10 in an operating position in which the seat fastening 10 can be slid in the fastening rail 12 in a longitudinal direction.

The locking device 18 is provided to displace the horizontal-fastening element 16 between its locking position and its unlocking position. Herein the locking device 18 is provided to move the horizontal-fastening element 16 in a displacement between its locking position and its unlocking position in a vertical direction as well as in a horizontal direction. A movement of the horizontal-fastening element 16 between its locking position and its unlocking position in a vertical direction during a displacement is herein by a multiple factor greater than the movement of the horizontal-fastening element 16 in a horizontal direction. In the displacement of the horizontal-fastening element 16 from the locking position into the unlocking position, the horizontal-fastening element 16 is firstly lifted in a vertical direction by means of the locking device 18 and is thus lifted out of the pass-through openings 36 of the fastening rail 12 and is then slid in a horizontal direction towards a rear region of the base body 14 and deposited in an unlocking position.

For displacement of the horizontal-fastening element 16, the locking device 18 comprises a lever unit 20. By means of the lever unit 20 the horizontal-fastening element 16 is displaceable between its locking position and its unlocking position. The lever unit 20 is herein pivotably connected to the horizontal-fastening element 16. For this purpose the horizontal-fastening element 16 comprises, on a side that faces in an assembled state the front region of the base body 14, a receptacle 70, which is provided to bear the lever unit 20. The receptacle 70 comprises a bearing axis 72, on which the lever unit 20 is pivotably borne. The bearing axis 72 herein runs orthogonally with respect to the longitudinal direction and to the vertical direction. For connecting the lever unit 20 to the horizontal-fastening element 16, the lever unit 20 forms a pass-through hole 74, which is coupled in a form-fit fashion to the bearing axis 72 of the receptacle 70 of the horizontal-fastening element 16. The pass-through hole 74 is herein embodied as a long hole.

For securing the lever unit 20, the seat fastening 10 comprises a spring element 76, which is arranged in the receptacle for the lever unit 20. The spring element 76 is embodied as a U profile, two resilient sides of the spring element 76 being in an assembled state oriented orthogonally to the bearing axis 72. The resilient sides of the spring element 76 are provided for pressing in an assembled state against lateral surfaces of the lever unit 20 to exert a securing force onto the lever unit 20. By means of the securing force transferred onto the lever unit 20 by the spring element 76, the lever unit 20 is in its respective positions secured against an unintended movement out of the respective position. Herein the securing force is so great that a displacement of the lever unit 20 due to, for example, a vibration, is prevented and an intended displacement of the lever unit 20, e.g. by a technician, is possible without problems.

The lever unit 20 comprises an assembly hole 84, which is provided as an assembly and disassembly aid. The assembly hole 84 is embodied as a pass-through hole and extends parallel to the pass-through hole 74 that is embodied as a long hole, via which the lever unit 20 is pivotably coupled to the horizontal-fastening element 16. The assembly hole 84 is provided such that during an assembly or a disassembly a tool can be introduced into the assembly hole and the lever unit 20 can thus be pivoted by means of the tool in case the lever unit 20 has, for example, got jammed and cannot be moved without a tool.

The seat fastening 10 comprises a support element 22, which is provided to support the lever unit 20. The support element 22 is herein embodied as a bulge which is molded to the base body 14. The support element 22 embodied as a bulge is herein located at a transition between the fastening element 38 for connecting the aircraft seat and the plateau 44, on which the horizontal-fastening element 16 is arranged in an assembled state. The bulge is herein embodied bumplike. A geometry of the support element 22 embodied as a bulge is herein implemented in such a way that it corresponds to a side of the lever unit 20 that in an assembled state faces the front region of the base body 14. For a displacement of the horizontal-fastening element 16 between the locking position and the unlocking position, the lever unit 20 is borne at the support element 22. In the unlocking position of the horizontal-fastening element 16 the lever unit 20 is also borne on the support element 22.

For fixating the horizontal-fastening element 16 in the unlocking position, the base body 14 comprises two form-fit elements 24, wherein respectively one of the form-fit elements 24 could be arranged on one of the long sides of the base body 14. The form-fit elements 24 are herein embodied identically, which is why in the following only one of the form-fit elements 24 is described in detail, wherein the description may be referred to for explaining the other form-fit element, which is not described nor shown in detail.

The form-fit element 24 is herein embodied in a one-part implementation with the base body 14. Herein the form-fit element 24 is embodied as a bulge molded to the base body 14. The form-fit element 24 is arranged on one of the long sides of the base body 14 in the region of the plateau 44. The form-fit element 24 is herein arranged in a position where it is in an assembled state of the horizontal-fastening element 16 overlapped by the horizontal-fastening element 16. Principally it is also conceivable that the base body comprises only one form-fit element 24 for fixating the horizontal-fastening element 16 or that the two or even more than two form-fit elements 24 are embodied respectively differently.

The horizontal-fastening element 16 comprises two form-fit elements 26, which are embodied correspondingly to the form-fit elements 24 of the base body 14 which are provided to fixate the horizontal-fastening element 16 in the unlocking position. The form-fit elements 26 are herein respectively arranged on an interior side of the horizontal-fastening element 16, which in an assembled state faces the base body 14. The form-fit elements 26 are herein embodied respectively equivalently to each other, which is why only the one form-fit element 26 is described in detail, wherein the following description may be referred to for explaining the other form-fit element of the horizontal-fastening element 16. For the purpose of fixating the horizontal-fastening element 16, the form-fit element 26 is provided to lie upon the form-fit element 24 of the base body 14. Herein the form-fit element 26 of the horizontal-fastening element 16 is in the unlocking position connected to the form-fit element 24 of the base body 14 in a self-locking fashion. The form-fit element 26 of the horizontal-fastening element 16 is herein arranged in such a way that the form-fit element 26 gets into contact with the form-fit element 24 of the base body 14 by a displacement in a vertical direction and by a displacement in a horizontal direction.

For fastening the seat fastening 10 in the fastening rail 12 in a defined position, the seat fastening 10 comprises a fastening element 28. The fastening element 28 is embodied as a fastening screw. The fastening element 28 is arranged in the pass-through hole 60 of the horizontal-fastening element 16 and in the pass-through hole 46 of the base body 14. The fastening element 28 comprises an outside thread, which is embodied correspondingly to the inside thread of the pass-through hole 46 of the base body 14. Via the outside thread the fastening element 28 can be firmly connected to the base body 14. The fastening element 28 firmly connects the horizontal-fastening element 16 and the base body 14 to each other. In a completely screwed-in state, the fastening rail 12 is clamped between the base body 14 and the horizontal-fastening element 16, as a result of which the horizontal-fastening element 16 and the base body 14 are additionally secured to the fastening rail 12. The seat fastening 10 comprises a spring element 78, which is functionally arranged between the horizontal-fastening element 16 and the fastening element 28. The spring element 78 is herein embodied as a coil spring. The spring element 78 that is embodied as a coil spring sits in the hollow 62 of the pass-through hole 60 of the horizontal-fastening element 16 and lies upon an underside of a screw head of the fastening element 28. A force transmission between the fastening element 28 and the horizontal-fastening element 16 is thus effected via the spring element 78 that is embodied as a coil spring.

For the purpose of securing the fastening element 28 that is embodied as a fastening screw in the pass-through hole of the base body 14, the seat fastening 10 comprises a securing pin 80, which is in an assembled state inserted into a transverse bore of the base body 14, which is oriented transversely with respect to the longitudinal direction of the base body 14 and which is tangent to the pass-through hole 46, in which the fastening element 28 is guided. In an assembled state, the securing pin 80 partially protrudes into the pass-through hole 46 of the base body 14 and forms a stop for a lower, broader end of the fastening element 28, which forms the support surface. Thereby the fastening element 28 can be prevented from falling out of the base body 14 and the horizontal-fastening element 16 can thus be securely connected to the base body 14.

The locking device 18 is in the locking position provided to secure the fastening element 28. In a state when the fastening element 28 has been screwed in and the horizontal-fastening element 16 is thus firmly connected to the base body 14, the locking device 18 secures the fastening element 28 against a rotation and thus against an unintended release of the fastening element 28. For this purpose, the lever unit 20 forms a form-fit element 82. In this the lever unit 20 is embodied hook-shaped. The form-fit element 82 herein engages into the fastening element 28 in a form-fit fashion for securing the fastening element 28. The form-fit element 82 of the lever unit 20 engages into a contour of the screw head of the fastening element 28, thus preventing the fastening element 28 from being rotated.

In the following a short description will be given of releasing the seat fastening 10 from the fastening rail 12 and subsequent displacing the seat fastening 10 with the horizontal-fastening element 16 being fixated in the unlocking position. First of all the lever unit 20 is rotated out of its closed position and the form-fit element 82 of the lever unit 20 is thus removed out of the screw head of the fastening element 28. As a result of this, the fastening element 28 can be opened. When the fastening element 28 has been removed out of the inner thread of the pass-through hole 46 of the base body 14, the spring element 78 that is embodied as a coil spring pushes the fastening element 28 partially out of the passthrough hole 60 of the horizontal-fastening element 16. By supporting the lever unit 20 on the support element 22 of the base body 14 and pushing the form-fit element 82 of the lever unit 20 toward the base body 14, the horizontal-fastening element 16 is lifted and thus the horizontal-form-fit elements 66, 68 are lifted out of the pass-through openings 36 of the fastening rail 12. When the horizontal-fastening element 16 has been lifted so far that the horizontal-form-fit elements 66, 68 have been lifted out of the pass-through openings 36 of the fastening rail 12, the horizontal-fastening element 16 is moved away from the front region of the base body 14 in a horizontal direction and is lowered by a certain distance in such a way that the form-fit elements 26 of the horizontal-fastening element 16 lie upon the form-fit elements 24 of the base body 14, as a result of which the horizontal-fastening element 16 is fixated in its unlocking position via a self-locking form-fit connection. Herein the horizontal-form-fit elements 66, 68 have now been lifted out of the passthrough openings 36 of the fastening rail 12 and the seat fastening 10 can be displaced in the fastening rail 12 without the horizontal-form-fit elements 66, 68 inadvertently reentering into pass-through openings 36 of the fastening rail 12. Thus the seat fastening 10 can now be transversed in the fastening rail 12 for a new positioning or can, for example, be removed out of the fastening rail 12.

For fastening the seat fastening 10 to the fastening rail 12, the process steps described above are carried out substantially in the opposite direction. First of all the horizontal-fastening element 16 is lifted by means of the lever unit 20 of the locking device 18, and thus the form-fit connection between the horizontal-fastening element 16 and the base body 14 is released. By way of sliding the horizontal-fastening element 16 toward the front region 40 of the base body 14, the form-fit elements 24 of the base body 14 and the corresponding form-fit elements 26 of the horizontal-fastening element 16 no longer meet and the horizontal-fastening element 16 can thus slide back toward the fastening rail 12, and the horizontal-form-fit elements 66, 68 can, with the pass-through openings 36 overlapping, re-engage into the pass-through openings 36, thus fixating the seat fastening 10 in a horizontal direction. The fastening element 28 can now be re-tightened and the lever unit 20 can be moved back into the screw head of the fastening element 28 for securing the fastening element 28 via the form-fit element 82.

REFERENCE NUMERALS

- 10 seat fastening
- 12 fastening rail
- 14 base body
- 16 horizontal-fastening element
- 18 locking device
- 20 lever unit
- 22 support element
- 24 form-fit element
- 26 form-fit element
- 28 fastening element
- 30 form-fit element
- 32 T-shaped longitudinal groove
- 34 longitudinal channel
- 36 pass-through opening
- 38 fastening element
- 40 front region
- 42 rear region
- 44 plateau
- 46 pass-through hole
- 48 underside
- 50 form-fit element
- 52 form-fit element
- 54 form-fit element
- 56 lateral region
- 58 middle region
- 60 pass-through hole
- 62 hollow
- 64 underside
- 66 horizontal form-fit element
- 68 horizontal form-fit element
- 70 receptacle
- 72 bearing axis
- 74 pass-through hole
- 76 spring element
- 78 spring element
- 80 securing pin
- 82 form-fit element
- 84 mounting hole

The invention claimed is:

1. A seat fastening device for fastening a seat, in particular an aircraft seat, to a fastening rail, with at least one base body, which is provided at least for a vertical fastening in the fastening rail, and with at least one horizontal-fastening element, which fixates the seat fastening in the fastening rail in a horizontal direction, in particular in a longitudinal direction of the fastening rail, in at least one operating position and is slidable with respect to the base body at least between a locking position and an unlocking position, with at least one locking device, which is provided to fixate the at least one horizontal-fastening element in the unlocking position, wherein the locking device is provided to move the horizontal-fastening element both in a vertical direction and in a horizontal direction, for the purpose of a displacement of the horizontal-fastening element between its locking position and its unlocking position, wherein the locking device comprises at least one lever unit, by means of which the horizontal-fastening element can be displaced between the locking position and the unlocking position, wherein the seat fastening device comprises at least one fastening element for fixating the base body, wherein the locking device is at least in the locking position provided to secure the fastening element, and wherein the lever unit forms a form-fit element, which at least in a locking position engages into the fastening element in a form-fit fashion for the purpose of securing the fastening element.

2. The seat fastening device according to claim 1, wherein the horizontal-fastening element engages around the base body.

3. The seat fastening device according to claim 1, comprising at least one support element, which is provided to support the lever unit at least during a displacement of the horizontal-fastening element and in the locking position.

4. The seat fastening device according to claim 3, wherein the support element is embodied as a bulge molded to the base body.

5. The seat fastening device according to claim 1, wherein the base body comprises a form-fit element, upon which in the unlocking position the horizontal-fastening element lies for the purpose of fixating.

6. The seat fastening device according to claim 5, wherein the form-fit element is embodied as a bulge molded to the base body.

7. The seat fastening device according to claim 5, wherein the horizontal-fastening element comprises a form-fit element, which is at least in the unlocking position connected to the form-fit element of the base body in a form-fit, self-locking manner.

8. An aircraft seat with a seat fastening device according to claim 1.

9. The seat fastening device according to claim 1, wherein the horizontal-fastening element comprises four horizontal-form-fit elements at its underside, wherein two horizontal-form-fit elements are arranged at a lateral region of the horizontal-fastening element, and extend away from the underside of the horizontal-fastening element and have a contour that corresponds to pass-through openings of the fastening rail.

* * * * *